Sept. 4, 1934.   M. J. JOHNSON   1,972,146
THERMOCOUPLE
Original Filed Oct. 18, 1930
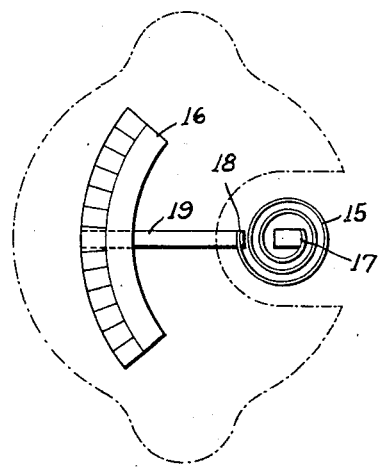
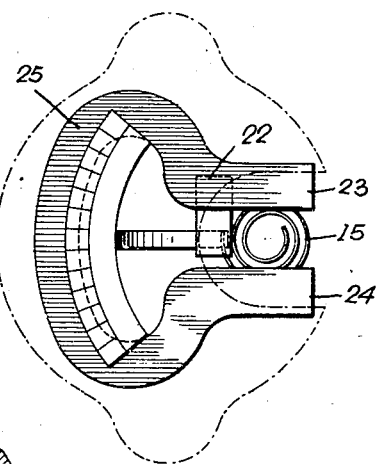
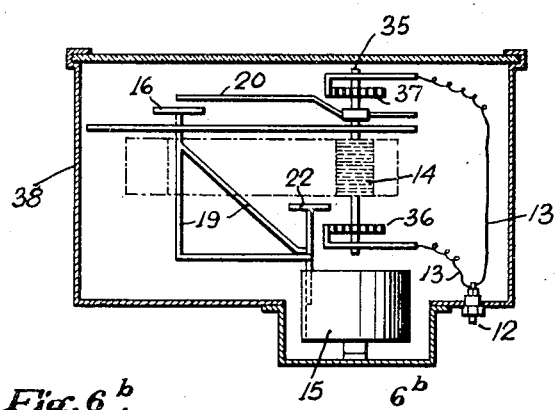
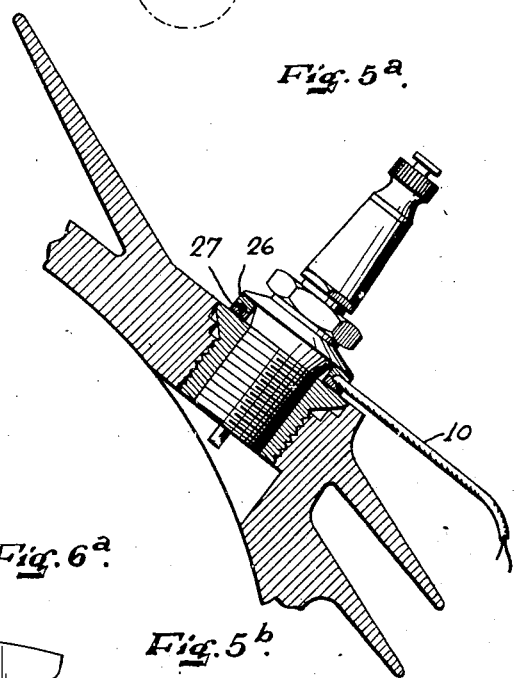
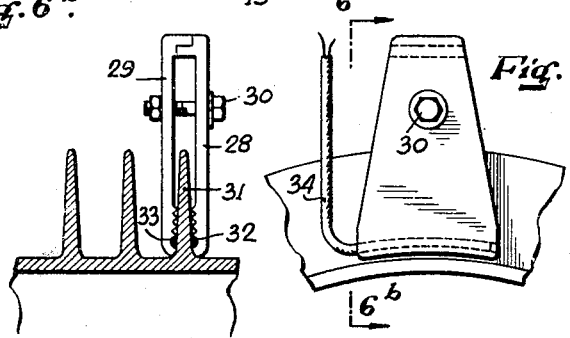
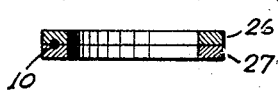
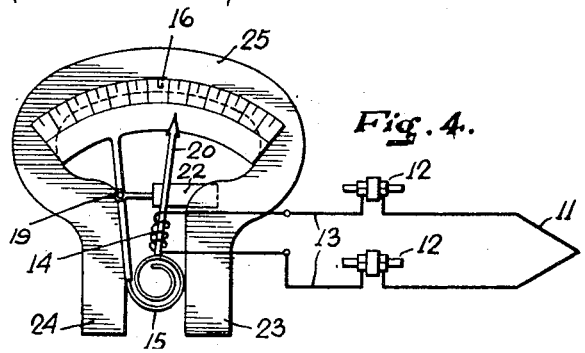
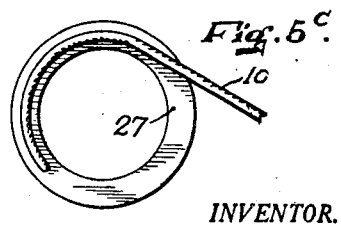
INVENTOR.
MANFRED J. JOHNSON,
BY Duell, Dunn & Anderson
ATTORNEYS.

Patented Sept. 4, 1934

1,972,146

UNITED STATES PATENT OFFICE 1,972,146

THERMOCOUPLE

Manfred J. Johnson, Naugatuck, Conn., assignor to The Lewis Engineering Company, Naugatuck, Conn.

Original application October 18, 1930, Serial No. 489,543. Divided and this application December 19, 1931, Serial No. 582,041

3 Claims. (Cl. 136—4)

This invention relates to electrical measuring instruments and relates more particularly to an electrical measuring instrument adapted for use with a thermocouple for indicating temperatures.

This application is a division of my co-pending application, Serial No. 489,543, filed October 18, 1930.

An object of the invention is to produce a thermocouple and an associated galvanometer which form in themselves a complete and accurate temperature measuring unit, requiring no auxiliary source of electrical current, and which is unaffected by external temperature changes.

Another object of the invention is to correct for external temperature changes at the cold junction of a thermocouple in an electrical measuring instrument associated with the thermocouple.

Another object of the invention is to correct for the effect of temperature changes on the resistance of the electrical conductors of an electrical measuring instrument.

Another object of the invention is to provide an efficient method of applying thermocouples in contact with surfaces, the temperature of which is to be measured.

In one embodiment of the invention, an ordinary moving coil type of galvanometer, having compensating means for temperature changes, is used to indicate temperature, and is electrically connected to a thermocouple which is in intimate contact with the surface, the temperature of which is to be measured.

The electromotive force generated in a thermocouple depends upon the difference of temperature between its cold junction and its hot junction. In order to accurately measure the temperature surrounding the hot junction, the temperature of the cold junction must be known or maintained at some known temperature, such as that of melting ice (32° F.), or compensated for in some manner. Every temperature change of the cold junction of a thermocouple, when used with a calibrated electrical instrument, unless compensated for or taken into account, results in an inaccurate indication of the temperature at the hot junction. In the past, auxiliary electrical current sources have been used in Wheatstone bridge circuits to compensate for temperature changes at the cold junction of the thermocouple. The disadvantage of such a method is that not only does an auxiliary battery or other source have to be utilized, but variations in voltage in such sources have to be compensated for, otherwise, the instruments are not accurate. Other methods have been practical for small temperature ranges, such as average room temperature changes, but have not been practical where extreme temperature changes are encountered, as when used on airplanes, automobiles, or for other outdoor applications when temperature ranges extend from very low to very high temperatures.

According to one feature of the present invention, a temperature measuring instrument capable of automatic compensation for extreme temperature changes and requiring no auxiliary source of electrical current is provided.

According to another feature of the invention, the thermocouple element is connected directly to the moving coil of the galvanometer so that the cold junction, of the thermocouple, has always the same temperature as that of the galvanometer elements.

According to another feature of the invention, temperature changes at the cold junction of the thermocouple are compensated for by automatic adjustment of the scale of the galvanometer to indicate temperature. This automatic compensation is achieved through the use of a bi-metallic coil spring, which rotates about its center with temperature changes, and to which is connected the indicating scale of the galvanometer, which is shifted by the rotation of the bi-metallic spring to change its position relative the pointer of the galvanometer as temperature changes occur.

According to another feature of the invention, the effect of temperature changes on the resistance of the electrical conductors of the galvanometer are automatically compensated for within the instrument. This automatic compensation is achieved by having a magnetic shunt comprising a piece of soft iron carried by the bi-metallic spring, referred to in the preceding paragraph, and which, on movement of the spring under the influence of temperature changes, bridges variably the gap between the poles of the galvanometer magnet to weaken the magnetic field acting on the galvanometer coil as the resistance of the electrical conductors increases.

According to another feature of the invention, a thermocouple element is so connected to the source of heat to be measured, that a considerable portion of the thermocouple is heated so that no appreciable conduction of heat along the thermocouple element from the hot junction can occur.

The invention will now be described with reference to the drawing, of which:

Fig. 1 is a plan view of a portion of a galvanometer, according to this invention, showing the bi-metallic spring attached to the indicating scale.

Fig. 2 is a vertical, partial sectional view through a galvanometer, according to this invention, showing the internal arrangement of the galvanometer.

Fig. 3 is a plan view of a portion of a galvanometer, according to this invention, and shows the arrangement of the magnetic shunt carried by the bi-metallic spring, relative to the pole pieces of the galvanometer permanent magnet.

Fig. 4 is a schematic view of a thermocouple, according to this invention, electrically connected to a galvanometer.

Fig. 5a is a view of a thermocouple unit connected between a pair of washers, one of which is clamped by a spark plug against the surface of an internal combustion engine.

Fig. 5b is an enlarged sectional view of the washers of Fig. 5a showing the thermocouple contained therebetween.

Fig. 5c is a top view of the lower washer of Fig. 5b showing the arrangement of the thermocouple unit in a groove in the washer.

Fig. 6a is a side view of a clamp, for housing the hot junction of a thermocouple, which is adapted to be clamped onto the cooling fin of an internal combustion engine.

Fig. 6b is a sectional view along the lines 6b—6b of Fig. 6a.

Referring now to Fig. 4 of the drawing, the thermocouple element 10 extends continuously from the hot junction 11 all the way to the terminal studs 12 of the galvanometer. The conductors 13, contained within the casing of the galvanometer and connecting the inner end of the terminal studs 12 to the galvanometer coil 14, are of the same metal as the thermocouple element. With this arrangement, it is seen that the cold junction of the thermocouple is effectively contained within the galvanometer casing and is therefore at the same temperature at all times as the moving coil 14 and the bi-metallic spring 15 of the galvanometer. There is practically no temperature drop in the large size terminal studs 12, due to their large size, high conductivity, and short length, so for all practical purposes the cold junction of the thermocouple may be presumed to be within the galvanometer casing.

Referring now to Figs. 1, 2, 3, and 4, the temperature compensating devices will be explained in detail. The galvanometer shown by Fig. 2 is of the well known D'Arsonval type except for the temperature compensating devices added according to this invention. The moving coil 14 is mounted on the shaft 35, on which is also mounted the hair springs 36 and 37 and the indicating needle 20. The permanent magnet 25 is so mounted in the casing 38 of the instrument that its pole pieces 23 and 24 are arranged on each side of the coil 14. The currents generated in the thermocouple 10 (Fig. 4) pass through the terminal studs 12, the leads 13 which are of thermocouple metal, the hair springs 36 and 37, and through the coil 14 which is rotated on the shaft 35 by the interaction between its field and the field between the pole pieces 23 and 24 of the magnet. The hair springs 36 and 37 serve to control the movement of the coil 14 and to return it towards its zero position when the energizing currents decrease. The coiled bi-metallic spring 15 has its inner end 17 fixedly attached to the galvanometer casing. Its outer end 18 is connected by the arm 19 to the indicating scale 16 of the galvanometer. The bi-metallic spring may consist of Invar metal on one side and brass on the other, and such a spring, due to the differences in the co-efficients of expansion of the two metals of which it is made up, as is well known, responds to temperature changes by rotating about its center when its temperature changes. Since the indicating scale 16 is connected to the free end of the bi-metallic coil 15, it is caused to move and to shift its position relative the pointer 20 of the galvanometer. Since the bi-metallic spring 15 is at the same temperature as the cold junction of the thermocouple, the scale 16 is shifted relative the pointer 20 of the galvanometer, as the temperature of the cold junction of the thermocouple changes. The accuracy of the galvanometer depends upon the difference in temperature existing between the cold junction and the hot junction of the thermocouple, and since, in an instrument of this kind, it is not practical to maintain the cold junction of the thermocouple at a constant temperature, the movement of the indicating scale, relative to the indicating needle of the galvanometer, adequately compensates for changes in cold junction temperatures. For example, as the cold junction temperature increases, there is less difference of temperature existing between the cold junction and the hot junction of the thermocouple so that the needle of the galvanometer does not move over the indicating scale as far as it should, but since the free end of the bi-metallic spring 15 moves, due to the increase of temperature at the cold junction, the scale 16 is moved bodily past the indicating needle of the meter so that the needle indicates a larger reading on the indicating scale than it would were not the temperature changes compensated for. Likewise, when the cold junction temperature decreases so that a greater difference in temperatures exists between the cold junction and hot junction of the thermocouple so that the galvanometer needle indicates too large a reading, the bi-metallic spring rotates in the opposite direction and moves the scale relative to the pointer so that the correct smaller reading is indicated. In all cases, the constants of the galvanometer elements and of the thermocouple are so related that for every change of cold junction temperature, the indicating scale shifts an amount just sufficient to compensate for the change of temperature.

Another error which enters into the accuracy of an electrical indicating instrument is the change in resistance of the copper windings as their temperature changes. For example, the copper conductors, making up the moving coil 14 of the galvanometer, increase in resistance as their temperature increases. Since an increase in resistance of the moving coil will affect the accuracy of the instrument, due to the fact that a portion of the electrical current will be consumed in the coil in overcoming the increased resistance, the coil will not move to a sufficient degree to indicate the amount of actuating current and the corresponding temperature to be measured. To enable the coil to move to the same extent, as it would were not its resistance increased by the increase of temperature, the magnetic force acting upon the coil is reduced a corresponding amount, enabling the coil to move to the same position that it would were not its temperature increased. This is accomplished by having the bi-metallic spring 15 carry a soft magnetic shunt 22 (see Figs. 2 and 3 of the (drawing) so that as the bi-metallic coil 15 rotates about its center with changes in temperature, the magnetic shunt 22 is moved to more completely bridge and to less completely bridge respectively, the gap between the pole pieces 23 and 24 of the permanent magnet 25 of the galvanometer. As the temperature surrounding the instrument increases, the resistance of the copper coil 14 increases, so that were the magnetic force constant, the coil would not move to as great a degree as it should, but due to the increase in temperature, the free end of the bi-metallic spring 15 moves and places the magnetic shunt 22 nearer the pole piece 24 of the magnet 25, thus more completely bridging the gap between the pole pieces of the magnet and weakening the magnetic field acting upon the moving coil 14. Likewise, a decrease in temperature, causing a decrease in the resistance of the coil 14, tends to cause the coil to indicate a larger reading on the scale, and is compensated for by the movement of the shunt 22 away from the pole piece 24, thus strengthening the magnetic field acting on the coil and resisting the tendency of the coil to cause the pointer 20 to over-read. The constants of the arrangement are so chosen that changes in resistance of the coil 14 are exactly compensated for by comparative changes in the magnetic flux acting upon the coil.

In mounting the hot junctions of thermocouples in a metallic surface, the temperature of which it is desired to measure, it has been the practice heretofore to drill two small holes in the surface, to insert the two thermocouple wires, and to pein over the edges of the holes to clamp the wires. This method is open to the very serious objection that considerable heat is conducted away from the hot junction by the thermocouple wires, this resulting in the instrument indicating too low temperatures. Another objection is that it is difficult to mount the thermocouple in such a fashion, and the thermocouple wires break very easily. According to this invention, the thermocouple is placed within an enclosure maintained at the temperature of the surface, the temperature of which it is desired to measure, in such a way that a considerable portion of the thermocouple is heated to the same temperature, thus preventing conduction of the heat away from the hot junction itself. One way in which this may be done may be seen with reference to Figs 5a, 5b, and 5c. The two washers 26 and 27 have annular grooves cut, as shown, in their contacting sides, leaving an opening of circular cross section between the two washers in which a considerable portion of the thermocouple 10 is inserted, as shown. The washers 26 and 27 are of such a size that they are adapted to be mounted between the base of a spark plug and the spark plug mounting. This is shown clearly in Fig. 5a of the drawing. A considerable portion of the thermocouple is inserted between the washers, which is heated to the same temperature as the hot junction so that no appreciable conduction of heat from the heated junction can occur.

Figs. 6a and 6b indicate another method of mounting a thermocouple, according to this invention. The mounting there shown comprises the two plates 28 and 29 which are clamped by means of the bolt 30 on each side of a cooling fin 31 of an engine. The lower portions of the clamps 28 and 29 are ribbed to insure intimate contact with the cooling fin 31. At the extreme lower ends of the plates 28 and 29 are drilled the holes 32 and 33 respectively, in which are mounted, as shown by Fig. 6a, the thermocouple, which in this figure is designated as 34. The thermocouple 34, being in intimate contact for a considerable length on both sides of the cooling fin 31, is heated to the temperature of the cooling fin for a considerable distance away from the hot junction so that no appreciable conduction from the heated junction can occur.

The temperature compensating devices described are so simple and may be made so compactly that very small galvanometers may be used for accurate recording. The galvanometers used may be of the standard type which are easily modified to include the temperature compensating features, and which are easily calibrated. The complete temperature measuring instrument, made in accordance with this invention, is capable of measuring a wide range of temperatures, rendering such an instrument peculiarly fitted for airplanes, automobiles, and for other outdoor applications where wide ranges of temperatures are expected.

Whereas, one thermocouple element has been shown in Fig. 4 as actuating its associated galvanometer, it should be understood that two or more thermocouple elements can be connected in series relation where it is desired to measure extremely high temperatures.

Whereas, one embodiment of the invention has been described for the purpose of illustration, it should be understood that the invention is not limited to the precise details described, but can be modified in many ways without departing from the spirit of the invention.

What is claimed is:

1. In combination, a thermocouple for measuring the temperature of a metal surface, a pair of metal members having grooves for the receipt of the thermocouple elements, and means for clamping said members together around said thermocouple and in contact with said surface.

2. In combination, a thermocouple for measuring the temperature of a metal surface comprising a pair of metal members, each having cooperating portions curved in an arc of a circle, and having cooperating annular grooves for the receipt of the thermocouple elements, and means for clamping said members, said thermocouple, and said surface together.

3. In combination, a thermocouple for measuring the temperature of the exterior of a metal surface, a pair of flat members, one of which is adapted to be clamped against a surface, the temperature of which is to be measured, grooves in said members for the receipt of the thermocouple elements, and means for clamping said members, said thermocouple, and said surface together.

MANFRED J. JOHNSON.